US010268440B2

(12) United States Patent
Ito et al.

(10) Patent No.: US 10,268,440 B2
(45) Date of Patent: Apr. 23, 2019

(54) VEHICLE DISPLAY SYSTEM, MOBILE TERMINAL APPARATUS, AND VEHICLE DISPLAY PROGRAM

(71) Applicant: DENSO CORPORATION, Kariya, Aichi-pref. (JP)

(72) Inventors: Masaya Ito, Kariya (JP); Hiroki Ukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/539,894

(22) PCT Filed: Jan. 13, 2016

(86) PCT No.: PCT/JP2016/000129
§ 371 (c)(1),
(2) Date: Jun. 26, 2017

(87) PCT Pub. No.: WO2016/117296
PCT Pub. Date: Jul. 28, 2016

(65) Prior Publication Data
US 2018/0011672 A1    Jan. 11, 2018

(30) Foreign Application Priority Data
Jan. 21, 2015    (JP) ................................ 2015-009449

(51) Int. Cl.
*G06F 3/14*    (2006.01)
*G06F 3/147*   (2006.01)
(Continued)

(52) U.S. Cl.
CPC .............. *G06F 3/147* (2013.01); *B60R 11/02* (2013.01); *G06F 3/1423* (2013.01);
(Continued)

(58) Field of Classification Search
None
See application file for complete search history.

(56) References Cited

U.S. PATENT DOCUMENTS

2008/0133084 A1 *   6/2008   Weinmann ........... H04M 1/6083
                                                        701/36
2011/0294490 A1    12/2011   Faenger
(Continued)

FOREIGN PATENT DOCUMENTS

JP    2009287973 A    12/2009
JP    2010224933 A    10/2010
(Continued)

*Primary Examiner* — Joseph R Haley
(74) *Attorney, Agent, or Firm* — Harness, Dickey & Pierce, P.L.C.

(57) ABSTRACT

According to a vehicle display system, a mobile terminal apparatus includes: a primary-screen-view display section that displays an output screen-view generated with execution of an application on the mobile terminal apparatus as a primary screen-view; a conversion section that converts the primary screen-view into a secondary screen-view complying with a vehicle apparatus; a manipulation layer generation section that generates a manipulation layer to manipulate the application; a state layer generation section that generates a state layer indicating a state of the mobile terminal apparatus; and a transmission section that transmits the secondary screen-view, the manipulation layer, and the state layer to the vehicle apparatus. The vehicle apparatus includes a secondary-screen-view display section that displays the manipulation layer and the state layer on the vehicle apparatus itself together with the secondary screen-view.

15 Claims, 6 Drawing Sheets

(51) Int. Cl.
    *B60R 11/02*      (2006.01)
    *H04M 11/00*      (2006.01)
    *H04N 21/431*     (2011.01)
    *H04M 1/725*      (2006.01)
    *H04N 21/414*     (2011.01)
    *H04N 21/4402*    (2011.01)
    *H04N 21/81*      (2011.01)
    *H04M 1/60*       (2006.01)
    *G09G 5/377*      (2006.01)

(52) U.S. Cl.
    CPC ........ *G06F 3/1462* (2013.01); *H04M 1/7253* (2013.01); *H04M 11/00* (2013.01); *H04N 21/41407* (2013.01); *H04N 21/41422* (2013.01); *H04N 21/431* (2013.01); *H04N 21/4402* (2013.01); *H04N 21/8173* (2013.01); *B60Y 2400/92* (2013.01); *G06F 3/1431* (2013.01); *G06F 3/1438* (2013.01); *G09G 5/377* (2013.01); *G09G 2380/10* (2013.01); *H04M 1/6075* (2013.01); *H04M 2250/16* (2013.01)

(56) References Cited

U.S. PATENT DOCUMENTS

| | | |
|---|---|---|
| 2012/0088523 A1 | 4/2012 | Shirakawa et al. |
| 2014/0092047 A1 | 4/2014 | Nara et al. |
| 2015/0082058 A1* | 3/2015 | Hahm .................. G06F 3/1454 |
| | | 713/320 |
| 2016/0328085 A1* | 11/2016 | Nagao .................. G06F 3/0418 |

FOREIGN PATENT DOCUMENTS

| | | |
|---|---|---|
| JP | 2012003374 A | 1/2012 |
| JP | 2013535123 A | 9/2013 |
| WO | WO-2012141294 A1 | 10/2012 |

* cited by examiner

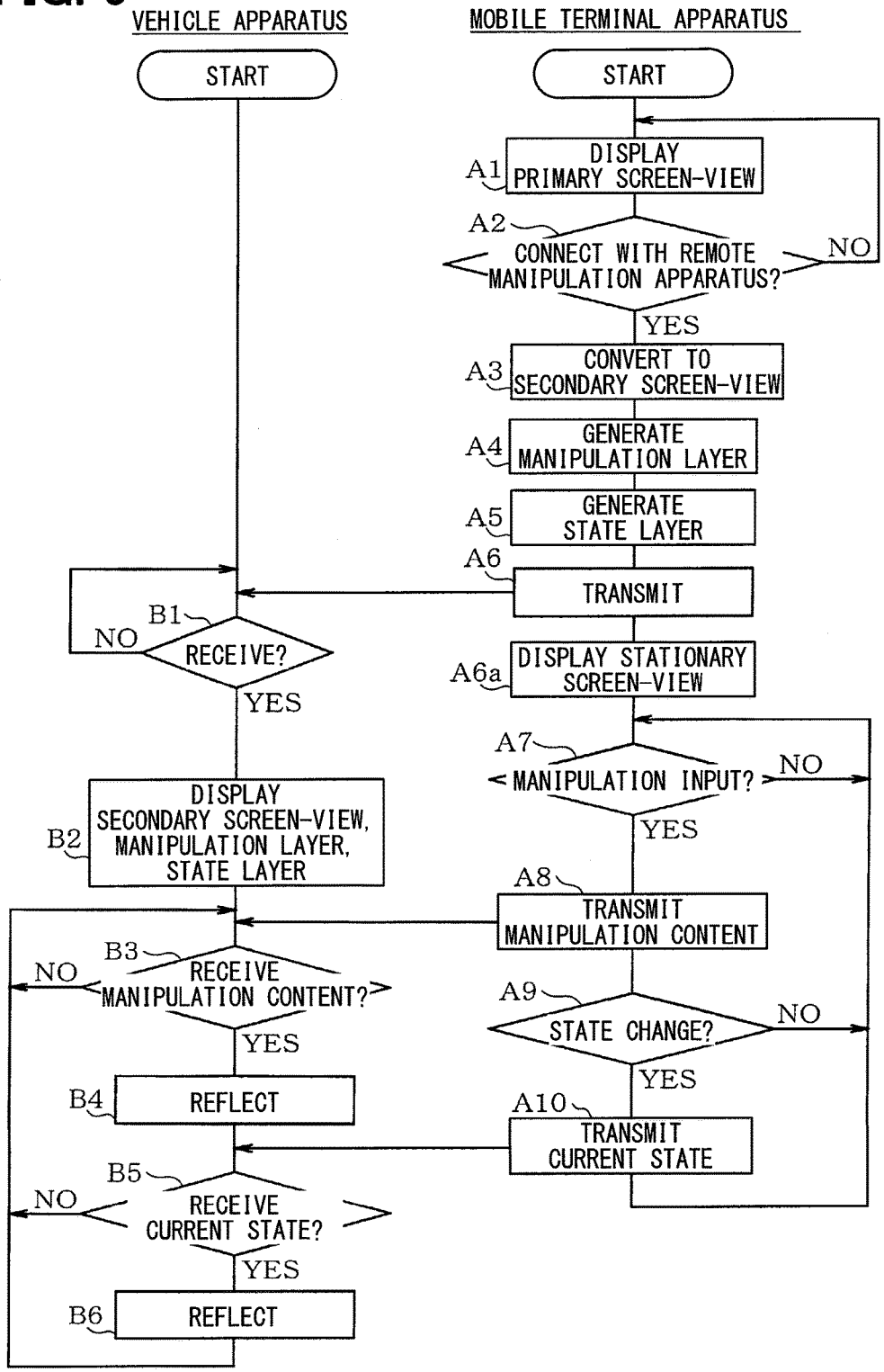

VEHICLE DISPLAY SYSTEM, MOBILE TERMINAL APPARATUS, AND VEHICLE DISPLAY PROGRAM

CROSS REFERENCE TO RELATED APPLICATIONS

This application is a U.S. National Phase Application under 35 U.S.C. 371 of International Application No. PCT/JP2016/000129 filed on Jan. 13, 2016 and published in Japanese as WO 2016/117296 A1 on Jul. 28, 2016. This application is based on and claims the benefit of priority from Japanese Patent Application No. 2015-009449 filed on Jan. 21, 2015. The entire disclosures of all of the above applications are incorporated herein by reference.

TECHNICAL FIELD

The present disclosure relates to: a vehicle display system that displays, on a vehicle apparatus, a screen-view (also called a screen image or a window) to display applications executed by a mobile terminal apparatus; a mobile terminal apparatus that forms the vehicle display system; and a vehicle display program embodied and executed in the mobile terminal apparatus.

BACKGROUND ART

A system that communicatively connects a mobile terminal apparatus to a vehicle apparatus mounted to a vehicle has been conventionally considered (see Patent Literature 1).

PRIOR ART LITERATURES

Patent Literature

Patent Literature 1: JP 2012-003374 A

SUMMARY OF INVENTION

A technique that displays, on a display of a vehicle apparatus, an output screen-view of an application executed by a mobile terminal apparatus has been considered for such a system. However, when a primary screen-view to be displayed on the display of the mobile terminal apparatus is directly transmitted to and displayed on the display, the layout may include small characters and be difficult to be seen. Recently, a technique that converts a primary screen-view into a secondary screen-view corresponding to a display of a vehicle apparatus and outputs the secondary screen-view to the display has been considered for mobile terminal apparatuses.

However, the current system assumes that applications are manipulated on a mobile terminal apparatus, and output screen-views of applications under execution are displayed on a vehicle apparatus. That is, the current system treats a display of a vehicle apparatus as just a sub display screen for display outputs, and does not assume manipulation inputs from the vehicle apparatus. Therefore, the current mobile terminal apparatuses do not include manipulative functions, namely, a function of generating a manipulation layer to manipulate applications and providing the layer to a vehicle apparatus and a function of generating a state layer to indicate a state of the mobile terminal apparatus and providing the layer to the vehicle apparatus. Thus, the current system is not capable of displaying the manipulation layer or state layer on a display of a vehicle apparatus. In general, a display of a vehicle apparatus has a larger display area than that of a mobile terminal apparatus. A manipulation layer and a state layer are therefore displayed on such a relatively large display of a vehicle apparatus to achieve improvement in manipulability and easiness in recognition of a state of a mobile terminal apparatus.

The present disclosure relates to a vehicle display system that converts a primary screen-view to be displayed on a display of a mobile terminal apparatus to a secondary screen-view corresponding to a display of a vehicle apparatus to display the secondary screen-view on the display, and provides a configuration that enables a manipulation layer and a state layer to be displayed on the display of the vehicle apparatus. The present disclosure also provides a mobile terminal apparatus that forms the vehicle display system and a vehicle display program embedded and executed in the mobile terminal apparatus.

According to an example of the present disclosure, a vehicle display system, which includes a vehicle apparatus mounted to a vehicle and a mobile terminal apparatus communicatively connected to the vehicle apparatus, displays, on the vehicle apparatus, an output screen-view of an application executed in the mobile terminal apparatus. The mobile terminal apparatus includes: a primary-screen-view display section that displays the output screen-view generated with execution of the application on a display of the mobile terminal apparatus as a primary screen-view; a conversion section that converts the primary screen-view into a secondary screen-view corresponding to a display of the vehicle apparatus; a manipulation layer generation section that generates a manipulation layer to manipulate the application; a state layer generation section that generates a state layer indicating a state of the mobile terminal apparatus; and a transmission section that transmits the secondary screen-view, the manipulation layer, and the state layer to the vehicle apparatus. In contrast, the vehicle apparatus includes a secondary-screen-view display section that displays the manipulation layer and the state layer on the display of the vehicle apparatus together with the secondary screen-view.

A program that achieves functions of the mobile terminal apparatus in the above vehicle display system is provided as another example of the present disclosure. This program can also be stored in a non-transitory computer-readable storage medium.

According to the above two examples, the manipulation layer and state layer can be displayed on a relatively large display of a vehicle apparatus. This achieves improvement in manipulability and easiness in recognition of a state of the mobile terminal apparatus.

BRIEF DESCRIPTION OF DRAWINGS

The above and other objects, features and advantages of the present disclosure will become more apparent from the following detailed description made with reference to the accompanying drawings. In the drawings:

FIG. 9 is a flowchart indicating an example of a display control according to a second embodiment.

EMBODIMENTS FOR CARRYING OUT INVENTION

Figure 1:
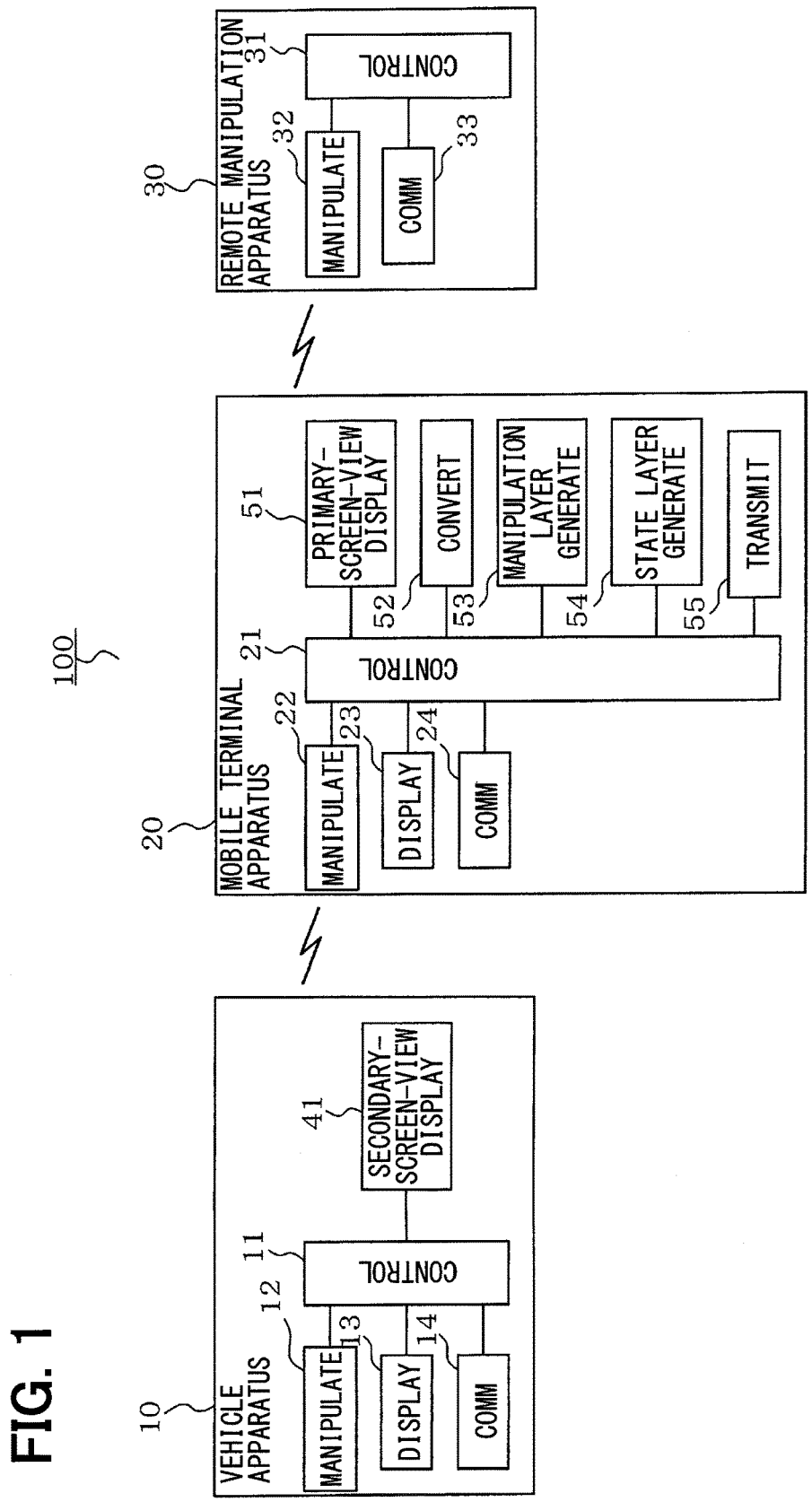
FIG. 1 is a block diagram schematically illustrating an example configuration of a vehicle display system according to a first embodiment.

Several embodiments of a vehicle display system are explained below in reference to the drawings. The substantially same components in respective embodiments are indicated by the same reference numerals, and are not explained.

First Embodiment

A vehicle display system 100 according to a first embodiment of the present disclosure in FIG. 1 includes a vehicle apparatus 10, a mobile terminal apparatus 20, and a remote manipulation apparatus 30. Hereafter, the vehicle display system 100 is called just "the display system 100." The display system 100 displays, on the vehicle apparatus 10, output screen-views of applications performed by the mobile terminal apparatus 20. The mobile terminal apparatus 20 is also called a mobile terminal.

The vehicle apparatus 10 includes various apparatuses mounted to a vehicle, such as a navigation apparatus. The vehicle apparatus 10 includes a control circuit 11, a manipulator 12, a display 13, and a communicator 14. The control circuit 11 is also called an electronic control unit, primarily includes a microcomputer containing a CPU and a memory as an example in the present embodiment, and controls the overall operation of the vehicle apparatus 10. The control circuit 11 executes a control program in the microcomputer to virtually achieve a secondary-screen-view display processing section 41, which may be referred to as a secondary-screen-view display processor 41, by software. The display processing section 41 of the vehicle apparatus 10 may also be hardwired.

The manipulator 12 includes touch panel switches of the display 13 and mechanical switches around the display 13, and outputs manipulation signals to the control circuit 11 in response to manipulations of various switches by a user. The display 13 includes a liquid crystal display to display various screen-views (also called screen images or windows) based on display command signals from the control circuit 11. The communicator 14 includes a wireless communication module. The communicator 14 establishes a wireless communication line with the mobile terminal apparatus 20 that is brought in a vehicle and present within a predetermined communication range, and wirelessly communicatively connects the vehicle apparatus 10 to the mobile terminal apparatus 20.

The secondary-screen-view display processing section 41 is an example of a secondary-screen-view display section, and displays, on the display 13 of the vehicle apparatus 10, a secondary screen-view (also called a second screen-view) obtained from the mobile terminal apparatus 20 as mentioned later in detail. The secondary-screen-view display processing section 41 displays a manipulation layer and a state layer that are obtained from the mobile terminal apparatus 20 on the display 13 of the vehicle apparatus 10 together with the secondary screen-view.

The mobile terminal apparatus 20 includes various mobile communication terminals carried by a user, such as a smartphone. The mobile terminal apparatus 20 includes a control circuit 21, a manipulator 22, a display 23, and a communicator 24. The control circuit 21 is also called an electronic control unit, and primarily includes a microcomputer having a CPU and a memory as one example in the embodiment to control the overall operation of the mobile terminal apparatus 20. The control circuit 21 executes a control program in the microcomputer to virtually achieve a primary-screen-view display processing section 51, which may be referred to as a primary-screen-view display processor 51, a conversion processing section 52, which may be referred to as a conversion processor 52, a manipulation layer generation processing section 53, which may be referred to as a manipulation layer generation processor 53, a state layer generation processing section 54, which may be referred to as a state layer generation processor 54, and a transmission processing section 55, which may be referred to as a transmission processor 55, by software. Each processing section is also called a processor. These sections 51 to 55 of the mobile terminal apparatus 20 may also be hardwired.

The manipulator 22 includes touch panel switches of the display 23 and mechanical switches around the display 23, and outputs manipulation signals to the control circuit 21 in response to manipulations of various switches by the user. The display 23 includes a liquid crystal display, and displays various screen-views based on display command signals from the control circuit 21. The communicator 24 includes a wireless communications module. The communicator 24 establishes a wireless communication line with the vehicle apparatus 10 within a predetermined communication range, and wirelessly communicatively connects the mobile terminal apparatus 20 to the vehicle apparatus 10.

The primary-screen-view display processing section 51 is an example of a primary-screen-view display section, and displays an output screen-view generated with execution of an application on the display 23 of the mobile terminal apparatus 20 as a primary screen-view (also called a first screen-view) when the control circuit 21 executes the application. The primary screen-view corresponds to the display 23 of the mobile terminal apparatus 20. That is, the primary screen-view matches the size and resolution of the display 23 (namely, the display area). Display elements such as a character size and a screen layout are displayed on the primary screen-view displayed on the display 23 to be visible by the user seeing the display 23.

The conversion processing section 52 is an example of a conversion section, and converts the primary screen-view to the secondary screen-view (also called a second screen-view) corresponding to the display 13 of the vehicle apparatus 10. That is, a variety of attribution information about the display 13 of the vehicle apparatus 10, such as a size and resolution of the display 13 (namely, the viewing area), is provided to the mobile terminal apparatus 20. The conversion processing section 52 converts the primary screen-view to the secondary screen-view formed to match the display 13 based on the attribution information about the display 13. As explained later in detail, display elements such as a character size and a screen layout are displayed on the secondary screen-view on the display 13 to be visible by the user seeing the display 13. The secondary screen-view does not include a function of manipulating applications or a function of indicating a state of the mobile terminal apparatus 20.

Figure 2:
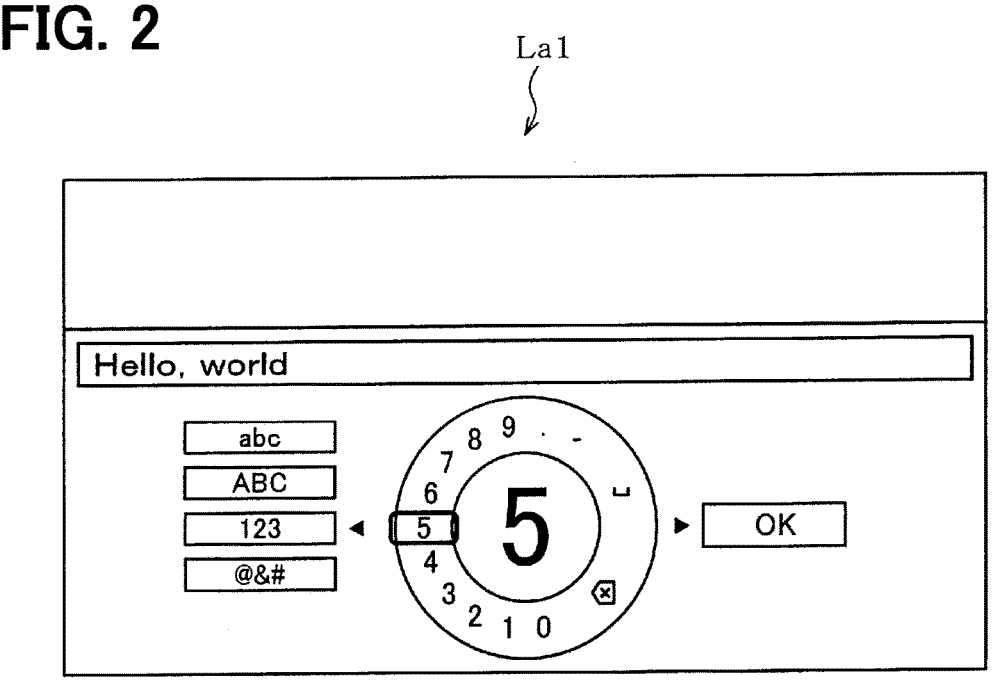
FIG. 2 is a diagram illustrating an example of a manipulation layer (No. 1)
Figure 3:
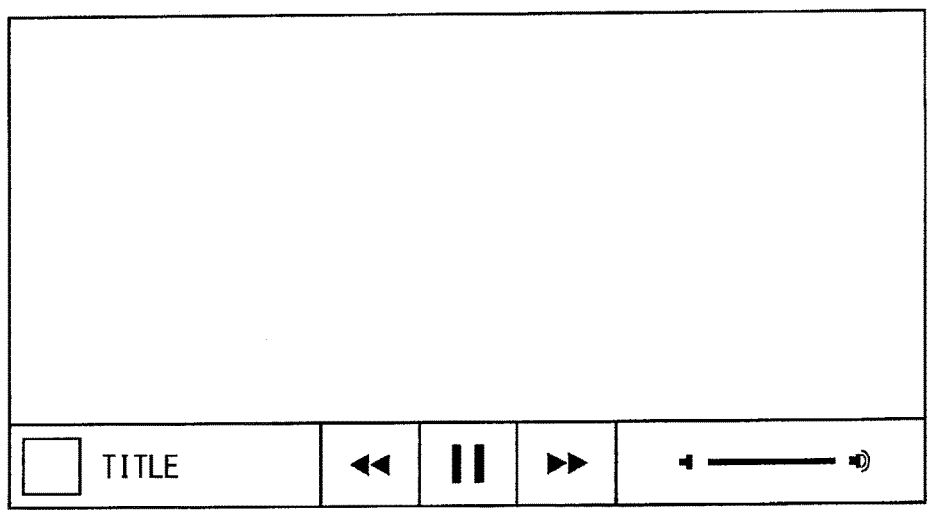
FIG. 3 is a diagram illustrating an example of a manipulation layer (No. 2)
Figure 4:
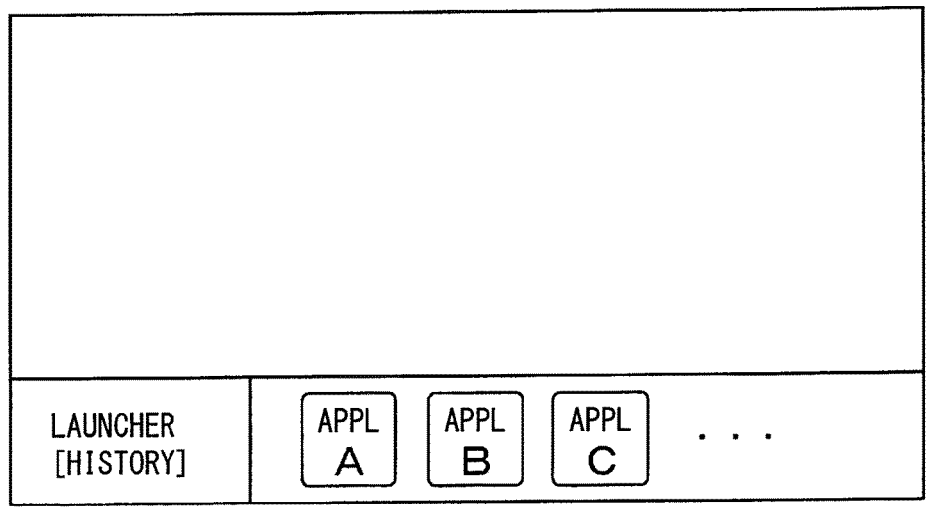
FIG. 4 is a diagram illustrating an example of a manipulation layer (No. 3)

The manipulation layer generation processing section 53 is an example of a manipulation layer generation section, and generates a manipulation layer to manipulate applications executed by the control circuit 21. The manipulation layers generated by the manipulation layer generation processing section 53 include a keyboard layer La1 in FIG. 2, a mini player layer La2 in FIG. 3, and a launcher layer La3 in FIG. 4. The keyboard layer La1 is to input alphabets, hiragana, katakana, numbers, and signs. The mini player layer La2 is to manipulate a mini player that plays audio sources. The launcher layer La3 is to manipulate a launcher function that calls applications executed in the past.

Figure 5:
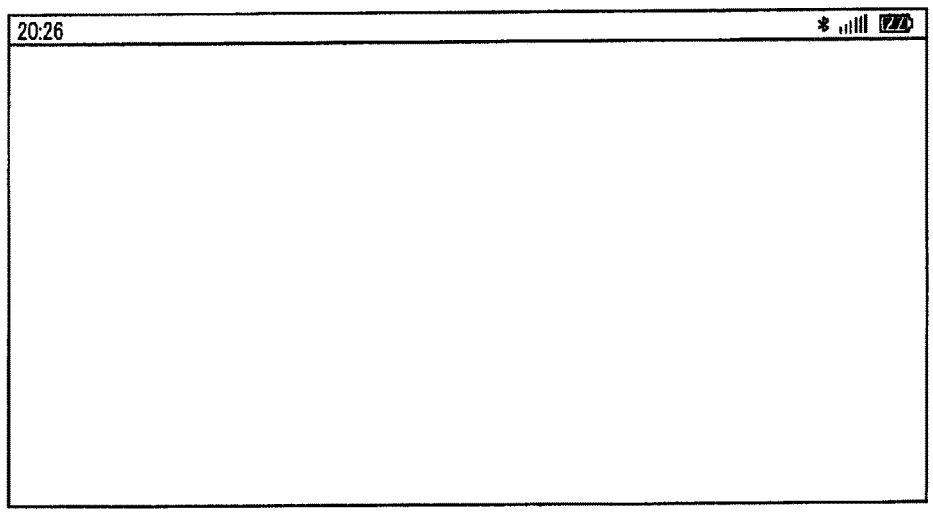
FIG. 5 is a diagram illustrating an example of a state layer.

The state layer generation processing section 54 is an example of a state layer generation section, and generates a state layer that indicates a current state of the mobile terminal apparatus 20. The state layer generated by the state layer generation processing section 54 includes a status bar layer Lb1 in FIG. 5. The status bar layer Lb1 is to indicate a current state of the mobile terminal apparatus 20, such as a state of a connection strength of the communication line established with the vehicle apparatus 10 and a charged state of an unshown battery of the mobile terminal apparatus 20.

The transmission processing section 55 is an example of a transmission section, and transmits data of the secondary screen-view generated by the conversion processing section 52, the manipulation layer generated by the manipulation layer generation processing section 53, and the state layer generated by the state layer generation processing section 54 to the vehicle apparatus 10 via the communicator 24. Only when the remote manipulation apparatus 30 is communicatively connected to the mobile terminal apparatus 20, these functional sections 52 to 54 operate. That is, the control circuit 21 turns off the functional sections 52 to 53 when the remote manipulation apparatus 30 is not communicatively connected to the mobile terminal apparatus 20. The control circuit 21 turns on the functional sections 52 to 54 when the remote manipulation apparatus 30 is communicatively connected to the mobile terminal apparatus 20.

The remote manipulation apparatus 30 is a controller dedicated to remotely manipulate the mobile terminal apparatus 20. The remote manipulation apparatus 30 is detachably attached to an unshown steering wheel of a vehicle. The remote manipulation apparatus 30 includes a control circuit 31, a manipulator 32, and a communicator 33. The control circuit 31 is also called an electronic control unit, and primarily includes a microcomputer containing a CPU and a memory as one example to control the overall operation of the remote manipulation apparatus 30 in the embodiment. The manipulator 32 includes unshown mechanical switches provided to the body of the remote manipulation apparatus 30, and outputs manipulation signals to the control circuit 31 in response to manipulations of the various switches by the user. The communicator 33 includes a wireless communication module, establishes a wireless communication line with the mobile terminal apparatus 20 in a predetermined communication range, and wirelessly communicatively connects the remote manipulation apparatus 30 to the mobile terminal apparatus 20. The control circuit 31 transmits various manipulation signals inputted from the manipulator 32 to the mobile terminal apparatus 20 via the communicator 33. The mobile terminal apparatus 20 operates based on the various manipulation signals inputted from the manipulator 22, and also can operate based on various manipulation signals inputted from the remote manipulation apparatus 30.

The following explains an example of a display control by the display system 100 using a flowchart. It is noted that a flowchart or the processing of the flowchart in the present application includes sections (also referred to as steps), each of which is represented, for instance, as A1 or B1. Further, each section can be divided into several sub-sections while several sections can be combined into a single section. Furthermore, each of thus configured sections can be also referred to as a device, module, processor, or a specific name. For instance, a conversion section may be also referred to as a conversion device, a conversion module, a conversion processor, or a converter. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

Figure 6:
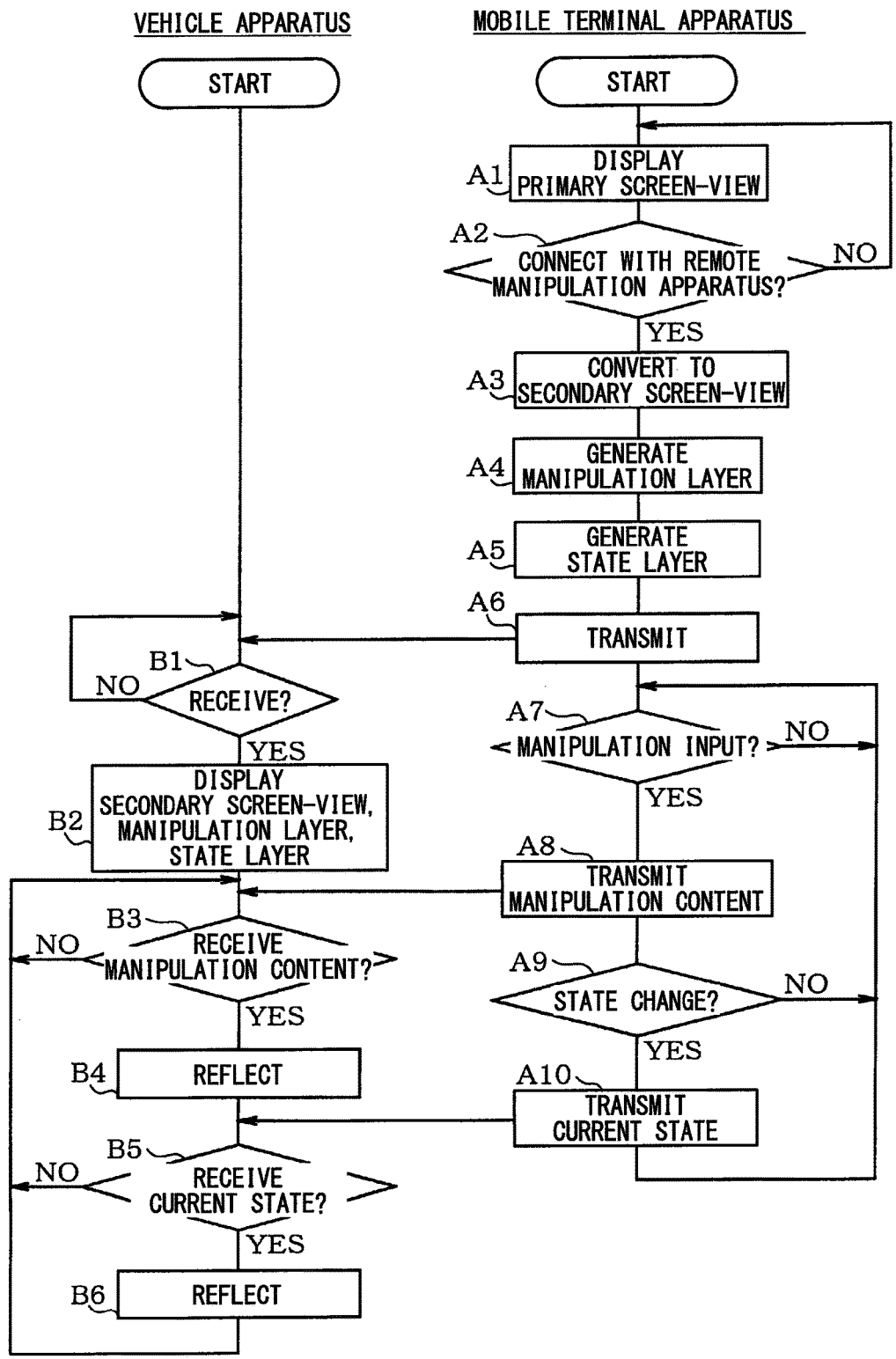
FIG. 6 is a flowchart illustrating an example of a display control according to the first embodiment.

The processing of the flowchart in FIG. 6 is repeated when the mobile terminal apparatus 20 and vehicle apparatus 10 start together and are in communication with each other. When the control circuit 21 starts execution of an application, the mobile terminal apparatus 20 displays, on the display 23 of the mobile terminal apparatus 20, an output screen-view generated with execution of the application as a primary screen-view (A1). The process of A1 is an example of the primary screen-view display process. The mobile terminal apparatus 20 determines whether the remote manipulation apparatus 30 is communicatively connected to the mobile terminal apparatus 20 (A2).

The mobile terminal apparatus 20 continues displaying the primary screen-view on the display 23 with execution of the application when the remote manipulation apparatus 30 is not communicatively connected to the mobile terminal apparatus 20 (A2: NO). However, the mobile terminal apparatus 20 converts the primary screen-view for the mobile terminal apparatus 20 into the secondary screen-view for the vehicle apparatus 10 (A3) when the remote manipulation apparatus 30 is communicatively connected to the mobile terminal apparatus 20 (A2: YES). The process of A3 is an example of the conversion. The mobile terminal apparatus 20 generates a manipulation layer and a state layer (A4, A5). The process of A4 is an example of the manipulation layer generation, and the process of A5 is an example of the state layer generation. The mobile terminal apparatus 20 transmits data of the obtained secondary screen-view, manipulation layer, and state layer to the vehicle apparatus 10 via the communicator 24 (A6). The process of A6 is an example of the transmission.

Figure 7:
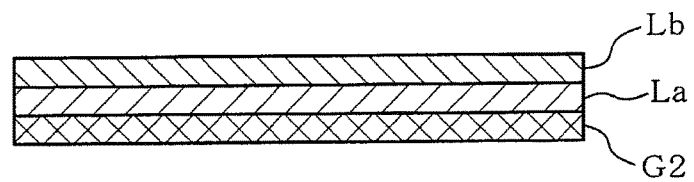
FIG. 7 is a diagram conceptually illustrating a cross section of display screen-views displayed on a display of a vehicle apparatus.
Figure 8:
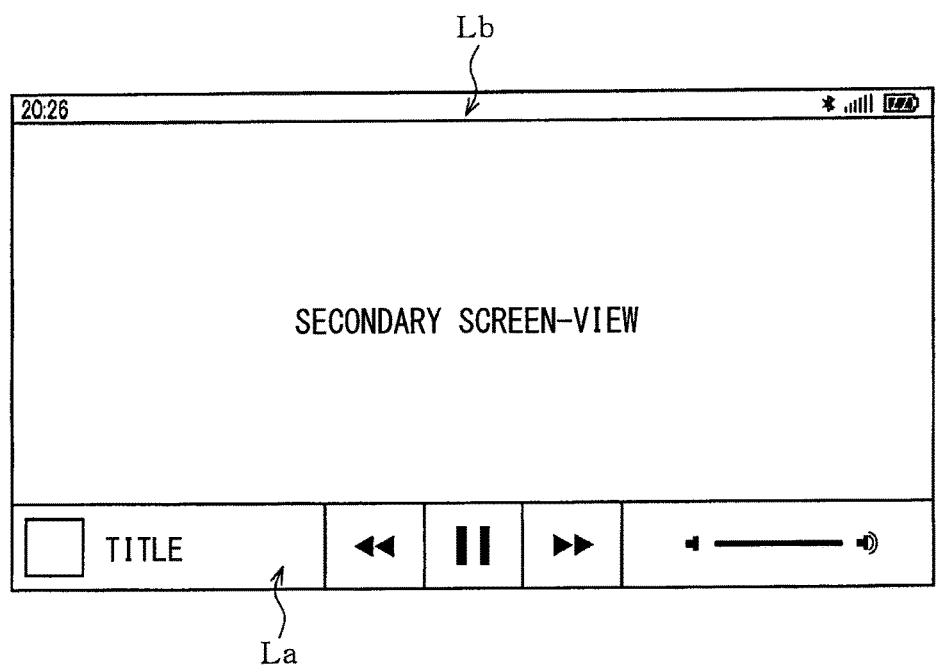
FIG. 8 is a diagram illustrating a display example of a secondary screen-view.

When receiving the data of the secondary screen-view, manipulation layer, and state layer from the mobile terminal apparatus 20 (B1: YES), the vehicle apparatus 10 displays the secondary screen-view, manipulation layer, and state layer on the display 13 of the vehicle apparatus 10 based on the received data (B2). At this time, the vehicle apparatus 10 uses a secondary screen-view G2 as a base as in FIG. 7, and displays the manipulation layer La and state layer Lb as overlays on the secondary screen-view G2. The manipulation layer La and state layer Lb are thereby displayed on the display 13 of the vehicle apparatus 10 together with the secondary screen-view as in FIG. 8.

When transmitting the data of the secondary screen-view, manipulation layer, and state layer, the mobile terminal apparatus 20 monitors whether a manipulation signal is inputted from the remote manipulation apparatus 30 (A7). When receiving the manipulation signal from the remote manipulation apparatus 30 (A7: YES), the mobile terminal apparatus 20 transmits the manipulation signal to the vehicle apparatus 10 (A8). The mobile terminal apparatus 20 operates based on the received manipulation signal. The mobile terminal apparatus 20 is thereby remotely controlled by the remote manipulation apparatus 30. In contrast, when receiving the manipulation signal from the mobile terminal apparatus 20 (B3: YES), the vehicle apparatus 10 makes the manipulation layer displayed on the display 13 reflect a manipulation content based on the manipulation signal (B4). The manipulation layer displayed on the display 13 thus changes as if being manipulated by the remote manipulation apparatus 30.

When transmitting the data of the secondary screen-view, manipulation layer, and state layer, the mobile terminal apparatus 20 monitors whether the state of the mobile terminal apparatus 20 changes (A9). That is, the mobile terminal apparatus 20 monitors a current state of the mobile terminal apparatuses 20, such as a change in a connection strength of the communication line established with the vehicle apparatus 10 and a change in a charged state of the battery. When the state of the mobile terminal apparatus 20 changes (A9: YES), the mobile terminal apparatus 20 transmits current state data indicating the changed state, namely the current state of the mobile terminal apparatus 20, to the vehicle apparatus 10 (A10). In contrast, when receiving the current state data from the mobile terminal apparatus 20 (B5: YES), the vehicle apparatus 10 makes the state layer displayed on the display 13 reflect the current state based on the current state data (B6). The state layer displayed on the display 13 thereby changes in conjunction with an actual change in the state of the mobile terminal apparatus 20.

The mobile terminal apparatus 20 repeatedly executes the process of A7 to A10 until the execution of the application is completed. The mobile terminal apparatus 20 ends this control when the execution of the application is completed. The mobile terminal apparatus 20 transmits a completion signal to the vehicle apparatus 10 when ending this control. In contrast, the vehicle apparatus 10 repeatedly executes the process of B3 to B6 until receiving the completion signal from the mobile terminal apparatus 20. The vehicle apparatus 10 ends this control when receiving the completion signal.

The manipulation layer and state layer are displayed on the relatively large display 13 of the vehicle apparatus 10 in the display system 100. The user can therefore manipulate applications based on the display content displayed on the larger display 13. This can improve the manipulability. Since the current state of the mobile terminal apparatus 20 is displayed on the larger display 13, the state can be easily recognized.

The mobile terminal apparatus 20 in the display system 100 generates the manipulation layer and state layer, and transmits the layers to the vehicle apparatus 10 on the condition that the remote manipulation apparatus 30 is communicatively connected to the mobile terminal apparatus 20. This configuration achieves a system in which manipulations of applications are inputted from the external remote manipulation apparatus 30 and the applications are outputted from the external vehicle apparatus 10 while the mobile terminal apparatus 20 executes the applications. That is, the user can use the applications based on manipulations of the remote manipulation apparatus 30 and on confirmation of the display content displayed on the vehicle apparatus 10 without being aware of the mobile terminal apparatus 20.

Second Embodiment

As in FIG. 9 in the present embodiment, when transmitting the data of the secondary screen-view, manipulation layer, and state layer to the vehicle apparatus 10 (A6), the mobile terminal apparatus 20 displays a predetermined stationary screen-view on the display 23 through the primary-screen-view display processing section 51 (A6a). The stationary screen-view is a static screen-view replaced by the dynamic primary screen-view. The stationary screen-view can use any motionless static screen-views, such as an overall-single-colored block screen-view, a screen-view having a predetermined pattern, and a screen-view having a logo mark of an application under execution.

The embodiment hides the dynamic primary screen-view displayed on the mobile terminal apparatus 20. The user can therefore concentrate on the secondary screen-view displayed on the vehicle apparatus 10, and use applications without being more aware of the mobile terminal apparatus 20.

Another Embodiment

The present disclosure is applicable to various embodiments. The manipulation layer and state layer are not restricted to what is illustrated above. Various layers can be used. The vehicle apparatus 10 and mobile terminal apparatus 20 may be communicatively connected to each other by wire. An attachment position of the remote manipulation apparatus 30 to the steering wheel is preferably set within a range easily reached by a finger of the user gripping the steering wheel.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. A vehicle display system comprising:
a vehicle apparatus mounted to a vehicle; and
a mobile terminal apparatus communicatively connected to the vehicle apparatus,
the vehicle display system displaying, on the vehicle apparatus, an output screen-view of an application executed in the mobile terminal apparatus,
the mobile terminal apparatus including:
a primary-screen-view display section that displays the output screen-view generated with execution of the application on a display of the mobile terminal apparatus as a primary screen-view;
a conversion section that converts the primary screen-view into a secondary screen-view corresponding to a display of the vehicle apparatus, the secondary screen-view being precluded from including each of (i) a function of manipulate the application and (ii) a function of indicating a state of the mobile terminal apparatus;
a manipulation layer generation section that generates a manipulation layer to manipulate the application;
a state layer generation section that generates a state layer indicating the state of the mobile terminal apparatus; and
a transmission section that transmits the secondary screen-view, the manipulation layer, and the state layer, to the vehicle apparatus,
the vehicle apparatus including a secondary-screen-view display section that displays the manipulation layer and the state layer on the display of the vehicle apparatus together with the secondary screen-view.

2. The vehicle display system according to claim 1, wherein
the primary screen-view display section displays a predetermined stationary screen-view on the display of the mobile terminal apparatus in response to the transmission section transmitting the secondary screen-view, the manipulation layer, and the state layer, to the vehicle apparatus.

3. The vehicle display system according to claim 1, further comprising
a remote manipulation apparatus that remotely manipulates the mobile terminal apparatus,
wherein
on a condition that the remote manipulation apparatus is communicatively connected to the mobile terminal apparatus,
the manipulation layer generation section generates the manipulation layer,
the state layer generation section generates the state layer, and
the transmission section transmits the manipulation layer and the state layer to the vehicle apparatus.

4. A mobile terminal apparatus communicatively connected to a vehicle apparatus mounted to a vehicle, the mobile terminal apparatus and the vehicle apparatus being included in a vehicle display system displaying, on the vehicle apparatus, an output screen-view of an application executed in the mobile terminal apparatus,
the mobile terminal apparatus including:
a primary-screen-view display section that displays the output screen-view generated with execution of the application on a display of the mobile terminal apparatus as a primary screen-view;
a conversion section that converts the primary screen-view into a secondary screen-view corresponding to a display of the vehicle apparatus, the secondary screen-view being precluded from including each of a function of manipulate the application and a function of indicating a state of the mobile terminal apparatus;
a manipulation layer generation section that generates a manipulation layer to manipulate the application;
a state layer generation section that generates a state layer indicating the state of the mobile terminal apparatus; and
a transmission section that transmits the secondary screen-view, the manipulation layer, and the state layer, to the vehicle apparatus.

5. A vehicle display program product stored in a non-transitory computer-readable storage medium, to be installed to be executed in a mobile terminal apparatus, the mobile terminal apparatus being communicatively connected to a vehicle apparatus, the mobile terminal apparatus and the vehicle apparatus being included in a vehicle display system, the vehicle display system displaying, on the vehicle apparatus, an output screen-view of an application executed in the mobile terminal apparatus, the program product executing processes comprising:
a primary-screen-view display process that displays the output screen-view generated with execution of the application on a display of the mobile terminal apparatus as a primary screen-view;
a conversion process that converts the primary screen-view into a secondary screen-view corresponding to a display of the vehicle apparatus, the secondary screen-view being precluded from including each of a function of manipulate the application and a function of indicating a state of the mobile terminal apparatus;
a manipulation layer generation process that generates a manipulation layer to manipulate the application;
a state layer generation process that generates a state layer indicating the state of the mobile terminal apparatus; and
a transmission process that transmits the secondary screen-view, the manipulation layer, and the state layer, to the vehicle apparatus.

6. The vehicle display system according to claim 1, wherein
the conversion section converts a layout of the primary screen-view into a layout of the secondary screen-view based on a size and a resolution of the display of the vehicle apparatus so as to be visible to a user seeing the display of the vehicle apparatus.

7. The vehicle display system according to claim 1, wherein
the conversion section converts a layout of the primary screen-view into a layout of the secondary screen-view so as to be formed to match the display of the vehicle apparatus based on attribution information of the display of the vehicle apparatus.

8. The vehicle display system according to claim 7, wherein
the attribution information is at least either (i) a size or (ii) a resolution of the display of the vehicle apparatus.

9. The vehicle display system according to claim 1, wherein
the state of the mobile terminal apparatus indicated by the state layer generation section is at least either (i) a state of a battery of the mobile terminal apparatus or (ii) a state of communication line with the vehicle apparatus.

10. The vehicle display system according to claim 2, wherein
the predetermined stationary screen-view displayed by the primary screen-view display section is a motionless static screen-view on the display of the mobile terminal apparatus.

11. The vehicle display system according to claim 10, wherein
the motionless static screen-view is a motionless picture appearing on the display of the mobile terminal apparatus.

12. The vehicle display system according to claim 11, wherein
the motionless picture is at least either (i) a predetermined pattern or (ii) a logo mark of the application under execution.

13. The vehicle display system according to claim 1, further comprising:
a remote manipulation apparatus that is capable of performing a wireless communication with the mobile terminal apparatus by establishing a wireless communication link between the remote manipulation apparatus and the mobile terminal apparatus,
wherein:
on a condition that the wireless communication link is established (A2: YES), the transmission section of the mobile terminal apparatus transmits the secondary screen-view, the manipulation layer, and the state layer to the vehicle apparatus, causing the secondary screen-view, the manipulation layer, and the state layer to be displayed on the display of the vehicle apparatus together with;
after the secondary screen-view, the manipulation layer, and the state layer are displayed on the display of the vehicle apparatus, the mobile terminal apparatus is remotely controlled by the remote manipulation apparatus so as to operate in response to receiving on a manipulation signal from the remote manipulation apparatus, the manipulation signal being transmitted by the remote manipulation apparatus based on a manipulation by a user.

14. The vehicle display system according to claim 13, wherein in response to receiving the manipulation signal from the remote manipulation apparatus, the mobile terminal apparatus transmits the manipulation signal to the vehicle apparatus; and in response to receiving the manipulation signal from the mobile terminal apparatus, the manipulation layer displayed on the display of the vehicle apparatus is caused to reflect a manipulation content corresponding to the manipulation signal as if being manipulated by the remote manipulation apparatus.

15. The vehicle display system according to claim 13, wherein after the secondary screen-view, the manipulation layer, and the state layer are displayed on the display of the vehicle apparatus, the mobile terminal apparatus monitors whether the state of the mobile terminal apparatus changes to a changed state;

in response to monitoring that the state of the mobile terminal apparatus changes to the changed state, the mobile terminal apparatus transmits a current state data indicating the changed state to the vehicle apparatus; and in response to receiving the current state data from the mobile terminal apparatus, the state layer displayed on the display of the vehicle apparatus is caused to reflect the changed state so as to change in conjunction with an actual change in the state of the mobile terminal apparatus.

\* \* \* \* \*